(12) United States Patent
Christophel et al.

(10) Patent No.: US 9,613,000 B2
(45) Date of Patent: Apr. 4, 2017

(54) TECHNIQUES TO REFINE SOLUTIONS TO LINEAR OPTIMIZATION PROBLEMS USING SYMMETRIES

(71) Applicant: SAS Institute Inc., Cary, NC (US)

(72) Inventors: Philipp M. Christophel, Raleigh, NC (US); Imre Polik, Cary, NC (US); Menal Guzelsoy, Morrisville, NC (US)

(73) Assignee: SAS INSTITUTE INC., Cary, NC (US)

( * ) Notice: Subject to any disclaimer, the term of this patent is extended or adjusted under 35 U.S.C. 154(b) by 440 days.

(21) Appl. No.: 14/204,037

(22) Filed: Mar. 11, 2014

(65) Prior Publication Data

US 2014/0258193 A1 Sep. 11, 2014

Related U.S. Application Data

(60) Provisional application No. 61/776,768, filed on Mar. 11, 2013.

(51) Int. Cl.
*G06F 17/11* (2006.01)

(52) U.S. Cl.
CPC .................. *G06F 17/11* (2013.01)

(58) Field of Classification Search
CPC ......... G06F 17/11; G06N 99/00; G06Q 10/04
See application file for complete search history.

(56) References Cited

U.S. PATENT DOCUMENTS 8,078,558 B2 * 12/2011 Kongtcheu ............. G06F 17/11
706/45

OTHER PUBLICATIONS

A Computational Comparison of Symmetry Handling Methods for Mixed Integer Programs, by PFETSCH, published 2015.*

(Continued)

*Primary Examiner* — Stanley K Hill
*Assistant Examiner* — Thomas Fink

(57) ABSTRACT

Techniques to refine solutions to linear optimization problems using symmetries are described. Some embodiments are particularly directed to techniques to refine solutions to linear optimization problems using symmetries to permute an existing solution into other feasible solutions that may improve upon the objective function. In one embodiment, for example, an apparatus may comprise a configuration component, an optimization component, a symmetries component, and an improvement component. The configuration component may be operative to receive an optimization problem described by an objective and constraints on a plurality of variables. The optimization interface component may be operative to receive an initial feasible solution to the optimization problem, the initial feasible solution comprising an assignment of values to the plurality of variables satisfying all the constraints, the initial feasible solution producing an initial objective value when applied to the objective. The symmetries interface component may be operative to receive one or more symmetries of the plurality of variables for the constraints, the one or more symmetries defining permutations of the plurality of variables guaranteed to produce only additional feasible solutions given the constraints when applied to an existing feasible solution. The improvement component may be operative to use the symmetries to produce permutations of the assignment of values to the plurality of variables, determine which of the permutations results in an improved objective value when applied to the objective, the improved objective value improving on the initial objective value produced by the initial feasible solution, and select the permutation that results in the improved objective value as an improved feasible solution to the optimization problem, the improved feasible solution improving on the initial feasible solution according to the objective. Other embodiments are described and claimed.

27 Claims, 9 Drawing Sheets

(56) References Cited

OTHER PUBLICATIONS

Reformulations in mathematical programming: automatic symmetry detection and exploitation, by Leo Liberti, published 2012.*
Chapter 10 Symmetry in Constraint Programming, Handbook of Constraint Programming, by Gent, published 2006.*
Symmetric ILP: Coloring and Small Integers, by Margot, published 2006.*
Symmetry in Integer Linear Programming, by Margot, published 2009.*
Algorithms for highly symmetric linear and integer programs, by Bodi, published 2011.*
New symmetries in mixed-integer linear optimization, by Christophel, published Aug. 2014.*
Detecting Orbitopal Symmetries, by Berthold, published 2008.*
Ostrowski et al., "Orbital Branching", Mathematical Programming, Ser. A (2011), 32 pages.
Fischetti et al., "Local Branching", Mathematical Programming, Ser. B, (2003), 25 pages.
Buchheim et al., "Linear optimization Over Permutation Groups", Discrete Optimization 2, 2005, 12 pages.
Rothberg, Edward, "An Evolutionary Algorithm for Polishing Mixed Integer Programming Solutions", INFORMS Journal of Computing, vol. 19, No. 4, Fall 2007, 8 pages.

* cited by examiner

700

Receive an optimization problem described by an objective and constraints on a plurality of variables.
702

Receive an initial feasible solution to the optimization problem, the initial feasible solution comprising an assignment of values to the plurality of variables satisfying all the constraints, the initial feasible solution producing an initial objective value when applied to the objective.
704

Receive one or more symmetries of the plurality of variables for the constraints, the one or more symmetries defining permutations of the plurality of variables guaranteed to produce only additional feasible solutions given the constraints when applied to an existing feasible solution.
706

Use the symmetries to produce permutations of the assignment of values to the plurality of variables.
708

Determine which of the permutations results in an improved objective value when applied to the objective, the improved objective value improving on the initial objective value produced by the initial feasible solution.
710

Select the permutation that results in the improved objective value as an improved feasible solution to the optimization problem, the improved feasible solution improving on the initial feasible solution according to the objective.
712

*FIG. 7*

TECHNIQUES TO REFINE SOLUTIONS TO LINEAR OPTIMIZATION PROBLEMS USING SYMMETRIES

RELATED APPLICATIONS

This application claims the benefit of priority under 35 U.S.C. §119(e) to U.S. Provisional Patent Application No. 61/776,768, titled "Symmetry-Based Heuristic Algorithms for Linear and Mixed Integer Programming," filed on Mar. 11, 2013, which is hereby incorporated by reference in its entirety.

BACKGROUND

Linear optimization problems define a problem in terms of linear constraints and a linear objective. These problems are based around an attempt to optimize the assignment of values to variables. The linear constraints restrain the space of feasible assignments of values to variables while the linear objective provides a metric for the quality of a particular assignment of values to variables. In general, one goal of linear programming, the solving of a linear optimization problem, is to satisfy the linear constraints while providing as good a solution as possible according to the linear objective, given the restrictions of the constraints, objective, and processing resources available. Mixed integer linear optimization problems may contain a further restriction that at least some of the variables are restricted to integer values, rather than the real values that may be used for the other variables.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to refine solutions to linear optimization problems using symmetries. Some embodiments are particularly directed to techniques to refine solutions to linear optimization problems using symmetries to permute an existing solution into additional feasible solutions that may improve upon the objective function. In one embodiment, for example, an apparatus may comprise a configuration component, an optimization component, a symmetries component, and an improvement component. The configuration component may be operative to receive an optimization problem described by an objective and constraints on a plurality of variables. The optimization interface component may be operative to receive an initial feasible solution to the optimization problem, the initial feasible solution comprising an assignment of values to the plurality of variables satisfying all the constraints, the initial feasible solution producing an initial objective value when applied to the objective. The symmetries interface component may be operative to receive one or more symmetries of the plurality of variables for the constraints, the one or more symmetries defining permutations of the plurality of variables guaranteed to produce only additional feasible solutions given the constraints when applied to an existing feasible solution. The improvement component may be operative to use the symmetries to produce permutations of the assignment of values to the plurality of variables, determine which of the permutations results in an improved objective value when applied to the objective, the improved objective value improving on the initial objective value produced by the initial feasible solution, and select the permutation that results in the improved objective value as an improved feasible solution to the optimization problem, the improved feasible solution improving on the initial feasible solution according to the objective. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 7 illustrates an embodiment of a logic flow for the system of FIG. 1.

DETAILED DESCRIPTION

Figure 1:
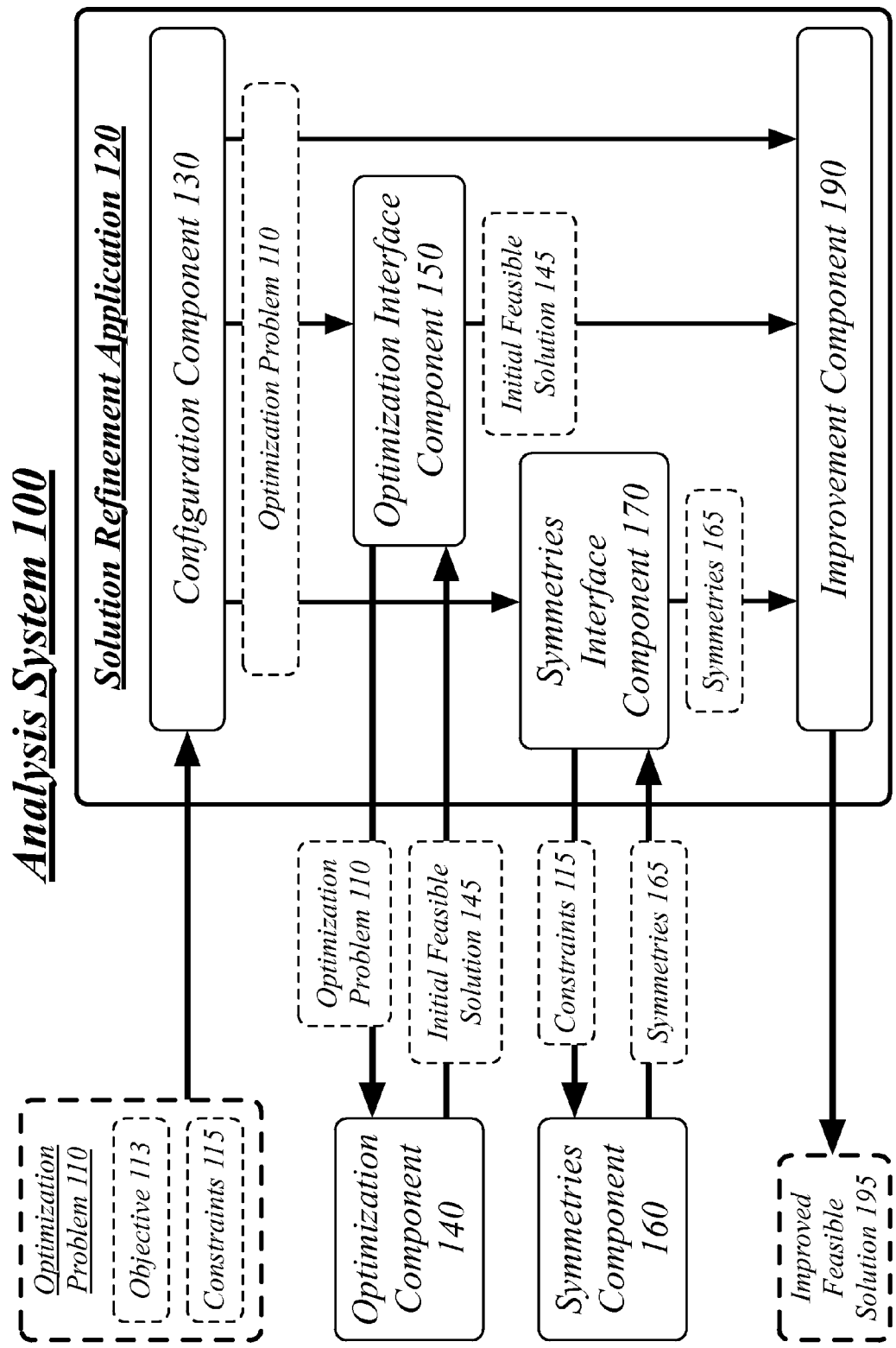
FIG. 1 illustrates an example of an analysis system for linear programming.

Various embodiments are generally directed to techniques to refine solutions to linear optimization problems using symmetries. Mathematical optimization has found increased use with increased access to computerized data and computational resources. Many decision-making problems can be expressed according to numerically-defined restrictions and with outcome variables expressed according to a function assigning a single numerical score to each particular decision. As such, linear programming—the mathematical solving of linear optimization problems—has become highly useful.

For example, a business may have access to a pool of contractors available for assignment to various tasks. Each of these contractors may have associated with them a value for each task that, according to some metric, represents their suitability for that task. Each of these contractors may also have associated with them a cost for their use. A set of constraints may therefore be specified which establish, for each task, a minimum suitability according to the metric for the contractor assigned to the task. An objective function may also be specified cumulating the total cost of hiring a particular set of contractors, with a lower total cost preferred (i.e., being optimized for). The set of constraints therefore limits which assignments of contractors to tasks are feasible (because each task must have a contractor assigned to it of at least minimum suitability) and which feasible assignments are preferable (because the assignment of contractors to tasks is at a relatively low, or the lowest, cost within the space of feasible assignments). Used together, an optimal solution to this problem would be the assignment of contractors to tasks that minimizes the total cost. However, with sufficiently large numbers of tasks and contractors, an optimal solution may be impractical to achieve. In such cases, one goal instead may be to minimize the total cost within a reasonable amount of time given a certain amount of computational resources.

In general, a solution to a linear optimization problem may be described as a particular assignment of values to the variables of the problem. The linear constraints define feasible assignments of values. The linear objective defines a single-number evaluation of the assignment of values to the variables. An optimal solution to a linear optimization problem would be an assignment of values to the variables of the problem that minimizes (or maximizes, depending on the problem) the linear objective while meeting the linear constraints. The optimal solution may be unique or may be one of a number of possible optimal solutions. An optimized solution (as distinguished from an optimal solution) to a linear optimization problem may be the result of an attempt to generate as good a solution as achievable given further real-world restrictions such as the available computational resources and computational time. For example, a linear optimization program may be given the processing resources of one or more computers (e.g., a single workstation or a computing cluster) for a specified period of time. The linear optimization program would then attempt to optimize the linear objective given those resources and within the specified amount of time.

In a general linear optimization problem any real number—or at least any of the finite subset of real numbers that a computer may be using as a stand-in for real numbers during computation—may be assigned to the variables. In other cases, however, some of the variables may be restricted to integer values. For example, in a linear optimization problem describing the generation of various types of widgets by a factory—where the linear program is designed to determine a number of each type of widget to manufacture, with the objective being to maximize profit—it may be that only an integer number of widgets of a given type may be manufactured. It may be practical to manufacture, for example, half a cubic foot of molding clay, but not to manufacture one-third of an action figure. An optimization problem in which at least some of the variables are restricted to integer values may be referred to as a mixed integer linear optimization problem. These may be referred to as "mixed" even where all of the variables are restricted to integer values, due to the classification being defined according to the additional difficulty that occurs where even one value is restricted to integers, which is neither abated nor meaningfully increased when all values are so restricted.

The linear constraints are commonly represented as a two-dimensional matrix and either a vector or a single value. In the example of assigning contractors to tasks, the vertical columns may represent specific contractors and the horizontal rows represent specific tasks. A task has a suitable assignment of one or more contractors in a solution if the solution to the optimization problem multiplied by the row of the two-dimensional matrix corresponding to the task produces a value at least equal to the minimum suitability. The minimum suitability may be defined for each task, such as by a vector, or globally as a single number. It will be appreciated that a linear constraint system using a single value as the restriction on the acceptability of the product of a solution with the linear constraint matrix may be represented as a vector wherein each element of the vector is that same single value, and that therefore the linear constraints may therefore always be represented as a pairing of a constraint matrix and a constraint vector. Each of the linear objective and a potential solution may be defined as a vector. The multiplication of the potential solution vector with the linear constraint matrix produces a vector, which may be compared to a vector representing the minimum (or maximum) value for the sum across a particular row, or may be compared to a single value representing the minimum (or maximum) value for the same of any row. This multiplication of the potential solution vector with the linear constraint matrix, and the comparison against the constraining vector or number, determines whether a potential solution is feasible according to the linear constraints. The potential solution vector may be multiplied with the objective function vector to determine the single numerical value representing the quality of the potential solution. A linear optimization program attempts to determine a feasible solution that minimizes (or maximizes) this single numerical value, the product of the potential solution vector and the objective function vector. It will be appreciated that any of the known techniques for representing linear optimization problems may be used. Additional information may be specified indicating where one or more of the variables are limited to integer values.

The linear constraint matrix and vector (or value) define the linear constraints, and thereby define the space of feasible solutions independently of the linear objective vector. The linear constraint matrix and vector are susceptible to analysis to determine a set of symmetries. A symmetry defines a permutation of a solution vector. Given the linear constraint matrix and vector, the symmetries for that joint matrix and vector indicate permutations of the solution vector that guarantee that if the original solution vector is a feasible solution for the linear constraints then the permuted solution generated according to one or more symmetries will also be a feasible solution. Because these symmetries are generated independently of the linear objective, these permuted solutions produce different evaluations of the solution from the original solution when evaluated according to the linear objective. As a result, some of the permuted solutions may improve on the original solution when evaluated according to the linear objective.

A particular symmetry defines a relationship between a subset of the variables of the optimization problem. For instance, a symmetry may indicate that a first pair of variables and second pair of variables may each be permuted within the pair while retaining the acceptability of a solution according to the constraints. In some cases, some of the variables within these symmetries may overlap between symmetries. For example, a first pair may be (1,3), the first and third variables, and a second pair (3,6). This indicates that the values assigned to the first and third variables may be swapped, and that the values assigned to the third and sixth variables may also be swapped. Implicitly, therefore, the values of the first and sixth variables may also be swapped due to their shared connection through the third variable. These pairings may be part of the generators for the set of symmetries, with the ability to permute freely amongst the first, third, and sixth variables a more complex permutation that can be generated by combining the generators.

As the permuted solutions are derived from an original solution to the optimization problem, the original solution must be found first. This original solution may be determined according to any of the known techniques for solving optimization problems. Because every permutation of the original solution based on the symmetries is a feasible solution according to the linear constraints, it may be highly efficient to search through these permutations for a permuted solution that improves on the original solution as compared to devoting extra computational time to whatever technique is used to generate the original solution. In many cases, the combination of a conventional linear programming technique and a refinement technique where a known solution is permuted according to symmetries may produce a superior solution in a given period of time than a conventional linear programming technique. As the time used for a refinement technique may be substantially smaller than the time used for a conventional linear programming technique, the refinement technique may be a valuable addition to any conventional linear objective problem solver. As a result, operators of a linear optimization problem solver may see improved results with the same outlay of computational resources or may be able to maintain an existing level of performance with a reduced commitment of computational resources, increasing both the functionality and scalability of linear optimization problem solvers.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an example of a block diagram for an analysis system 100. In one embodiment, the analysis system 100 may be a computer-implemented system having a software solution refinement application 120 comprising one or more components. Although the analysis system 100 shown in FIG. 1 has a limited number of elements in a certain topology, it may be appreciated that the analysis system 100 may include more or less elements in alternate topologies as desired for a given implementation.

The analysis system 100 may comprise the solution refinement application 120. The solution refinement application 120 may be generally arranged to receive an optimization problem 110 composed of an objective 113 and constraints 115, to receive an initial feasible solution 145 to the optimization problem 110, to receive symmetries 165 for the constraints 115, and to use the symmetries 165 to improve the initial feasible solution 145 to produce an improved feasible solution 195. In various cases, the solution refinement application 120 may be a stand-alone application operating in concert with other applications (such as a conventional linear optimization problem solver), may be a plugin loaded into another application (such as a conventional linear optimization problem solver), may be an integrated element of a linear optimization problem solver, or may generally be arranged according to any of the known techniques for integrating with other computer and/or software elements.

The solution refinement application 120 may comprise a configuration component 130. The configuration component 130 may be operative to receive an optimization problem 110 described by an objective 113 and constraints 115 on a plurality of variables. The optimization problem 110 may be provided to the configuration component 130 as a file or other data store containing the objective 113 and constraints 115 in a known format. The optimization problem 110 may comprise a linear optimization problem, and may comprise a mixed integer linear optimization problem.

The solution refinement application 120 may comprise an optimization interface component 150 operative on the processor circuit to receive an initial feasible solution 145 comprising an assignment of values to the plurality of variables. The optimization interface component 150 may receive the initial feasible solution 145 from an optimization component 140. The optimization component 140 may operate according to any known techniques for solving optimization problems. The optimization component 140 may be an integrated element of an optimization problem solver with the solution refinement application 120 or may be an element of a separate application. In some cases, the optimization problem 110 may be provided to the optimization component 140 by the optimization interface component 150. In other cases, the optimization problem 110 may be provided to the optimization component 140 separately. For example, a user may run a conventional linear optimization problem solver including the optimization component 140, produce the initial feasible solution 145, and then provide the initial feasible solution 145 and the optimization problem 110 to the solution refinement application 120 for refinement. The initial feasible solution 145 may comprise a vector, list of values, or other data structure indicating a value for each of the variables of the optimization problem 110, wherein the assignment of the values to the variables satisfies the constraints 115. The initial feasible solution 145 may produce an initial objective value when applied to the objective 113. Applying a solution to the objective 113 may consist of performing vector multiplication between the objective 113 expressed as a vector and the solution expressed as a vector.

The solution refinement application 120 may comprise a symmetries interface component 170. The symmetries interface component 170 may be generally arranged to receive one or more symmetries 165 for the constraints 115. In some cases, the symmetries 165 may be provided via generators, mathematical descriptors of the most basic symmetries that can be combined together to produce the entire space of possible symmetries for the constraints 115. The symmetries 165 may be provided by a symmetries component 160. The symmetries component 160 may be an integrated element of the solution refinement application 120, may be an integrated element of a larger optimization problem solver application, may be a plugin loaded into the solution refinement application 120 or a larger optimization problem solver application, or may be part of a separate application, such as a math support application. The symmetries component 160 may generate the symmetries 165 according to known techniques for determining symmetries given a set of constraints 115, such as by applying an individualize-and-propagate scheme to the matrix defining the constraints 115. The symmetries component 160 may generate the symmetries 165 in response to a request from the symmetries interface component 170 including the constraints 115, or may separately generate the symmetries 165, such as in response to a user request, where the user then provides the symmetries 165 to the solution refinement application 120 as part of the configuration of the solution refinement application 120.

The solution refinement application 120 may comprise an improvement component 190 operative on the processor circuit to use the symmetries 165 to determine an improved feasible solution 195 to the optimization problem 110 according to the objective 113. An improved feasible solution 195 improves on the initial feasible solution 145 by producing an improved objective value when applied to the objective 113 as compared to an initial objective value produced by applying the initial feasible solution 145 to the objective 113. When the optimization problem 110 seeks a minimal feasible solution (a feasible solution of minimum possible value), the improved objective value improves on the initial objective value when the improved objective value is less than the initial objective value. Similarly, when the optimization problem 110 seeks a maximal feasible solution (a feasible solution of maximum possible value), the improved objective value improves on the initial objective value when the improved objective value is greater than the initial objective value.

The improvement component 190 may use the symmetries 165 to determine the improved feasible solution 195 to the optimization problem 110 by searching alternative solutions determined by permuting the initial feasible solution 145 according to the symmetries 165. The improvement component 190 may use the symmetries 165 to permute the assignment of values corresponding to the initial feasible solution 145. The improvement component 190 may determine which of the permutations results in a greatest improvement to the objective 113 and use the permutation which results in the greatest improvement as the improved feasible solution 195. The improvement component 190 may select the permutation that results in an improved objective value as the improved feasible solution 195 to the optimization problem 110, the improved feasible solution 195 improving on the initial feasible solution 145 according to the objective 113. The improvement component 190 may use any of a variety of known search techniques to search the space of feasible solutions generated by permuting the feasible solution 195, such as neighborhood search algorithms, evolutionary algorithms, and divide-and-conquer search algorithms.

Figure 2:
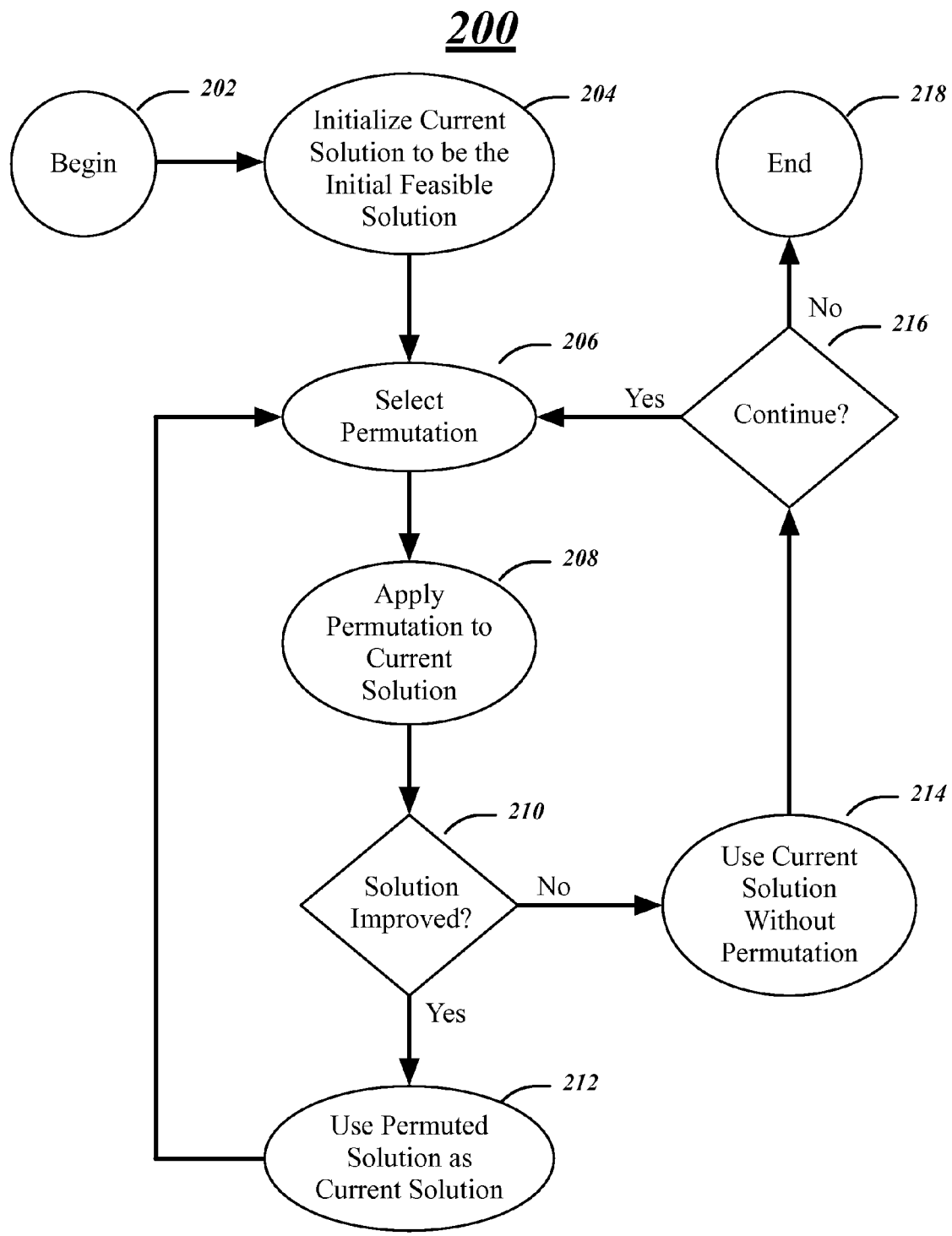
FIG. 2 illustrates an example of a logic flow for iteratively improving a solution.

FIG. 2 illustrates an example of a logic flow 200 for the analysis system 100. As shown in FIG. 2, the logic flow 200 performs a search of the space of feasible solutions generated by permuting the initial feasible solution 145. It will be appreciated that logic flow 200 illustrates one possible search technique across the space of permuted solutions and that other search techniques may be used in combination with symmetries 165.

The logic flow 200 may begin at block 202. Beginning at block 202 may correspond to the initiation of the tasks performed by the improvement component 190. For instance, block 202 may be initiated once the improvement component 190 receives the optimization problem 110, initial feasible solution 145, and symmetries 165.

The logic flow 200 may initialize a current solution to be the received initial feasible solution 145 at block 204. The logic flow 200 may attempt to iteratively improve the current solution by using the symmetries 165 to generate permutations. By beginning with the initial feasible solution 145 the various permutations that comprise the current solution are guaranteed to be additional feasible solutions according to the constraints 115 by the definition of what qualifies as a symmetry of the variables for the constraints.

The logic flow 200 may select a permutation at block 206. The permutation may be selected from those indicated by the symmetries 165. The permutation may be selected from the symmetries 165 at random, in a predefined sequence, or according to any of the known techniques for selecting particular options in a search.

The logic flow 200 may apply the selected permutation to the current solution at block 208. A permutation specifies a particular rearrangement of the values assigned to variables, specific to the variables of the optimization problem 110 but independent of the currently assigned values of the current solution or the initial feasible solution 145. For example, if the optimization problem 110 is on twelve variables, then a permutation may specify that the values of the third and eleventh variables are to be swapped. A more complex permutation may specify that the value of the second variable should be moved to the fifth variable, that the value of the fifth variable should be moved to the tenth variable, and that the value of the tenth variable should be moved to the second variable. In general, a permutation includes a list of variables whose values are to be permuted and, if more than two variables are listed, an ordering in which those variables should have their values changed.

The logic flow 200 may determine at block 210 whether this new permutation of the current solution improves upon the previous permutation of the current solution according to the objective 113. Applying the objective 113 to both the current solution prior to the most recent permutation and to the current solution after the most recent permutation will result in two particular values, which can be compared to determine whether the permutation improves the solution. If the optimization is for a minimal value, then the permutation improves the current solution if it produces a lower value when combined with the objective 113 than the objective 113 did when combined to the current solution without that permutation. Similarly, if the optimization is for a maximal value, then the permutation improves the current solution if it produces a higher value when combined with the objective 113 than the objective 113 did when combined to the current solution without that permutation. In general, the permutation improves the current solution if it changes the value produced by multiplying the current solution with the objective 113 in the direction indicated by the optimization problem 110. If the permutation improves the current solution, the logic flow 200 proceeds to block 212. If the permutation does not improve the current solution, the logic flow 200 proceeds to block 214.

The logic flow 200 may use the permuted solution as the current solution at block 212. As block 212 is reached when the permutation improves the current solution, the permutation is applied to the current solution and used as the new best-known solution. The logic flow 200 then proceeds back to block 206 using the new current solution in an attempt to further refine this currently best-known solution.

The logic flow 200 may use the current solution without this most recent permutation at block 214. As block 214 is reached when the permutation does not improve the current solution—either producing the same objective value as the current solution or a worse objective value—this permutation is not retained for the current solution.

The logic flow 200 may determine whether to continue at block 216. In some cases, the logic flow 200 may terminate if all permutations have been attempted with the current solution without improving it. In other cases, the logic flow 200 may be given a limited number of cycles, limited number of time, or other limitation on the extent of its processing that occurs prior to the exhaustion of the possible permutations. In these cases, the logic flow 200 may terminate prior to every permutation being attempted. If the logic flow 200 is determined to continue, it proceeds back to block 206. If the logic flow 200 is determined to not continue, it proceeds to block 218.

The logic flow 200 may end at block 218. Ending the logic flow 200 may comprise the termination of the bulk of the work by the improvement component 190, with the exception of returning the current solution as the improved feasible solution 195. As the current solution has been iteratively improved according to the permutations, it may represent the best solution achievable by permuting the initial feasible solution 145. However, in some cases, such as where the logic flow 200 was terminated after a set period of time or fixed number of cycles, it may merely represent the best solution found during the allowed period. If no permutation was found that improved the initial feasible solution 145, the logic flow 200 (and therefore the improvement component 190) may either return the initial feasible solution 145 as the improved feasible solution 195 or may return an indication that no improvement was determined.

Figure 3:
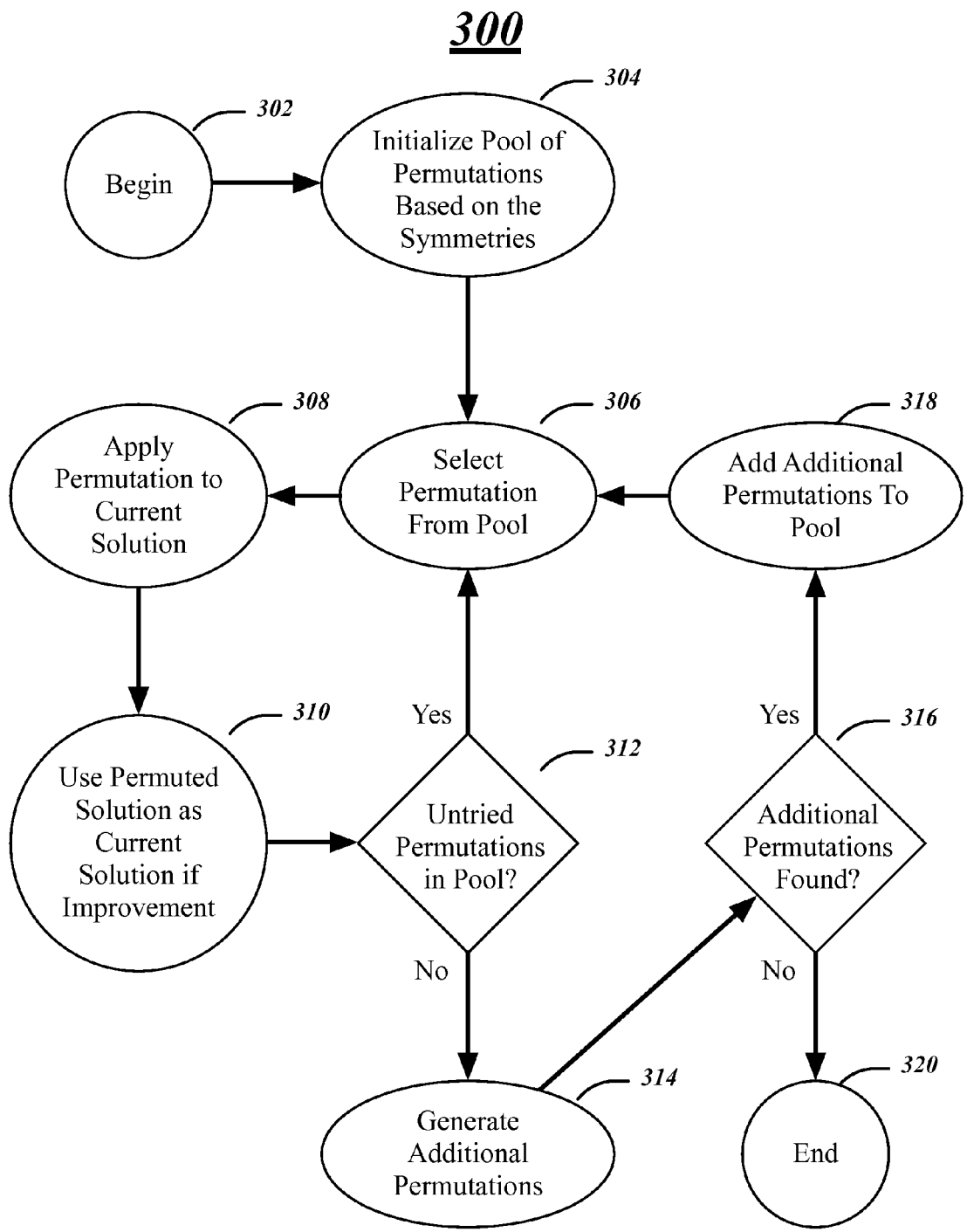
FIG. 3 illustrates an example of a logic flow for applying and generating permutations.

FIG. 3 illustrates an example of a logic flow 300 for the analysis system 100. As shown in FIG. 3, the logic flow 300 performs a search of the space of feasible solutions generated by permuting the initial feasible solution 145. It will be appreciated that logic flow 300 illustrates one possible search technique across the space of permuted solutions and that other search techniques may be used in combination with symmetries 165.

The logic flow 300 may begin at block 302. Beginning at block 302 may correspond to the initiation of the tasks performed by the improvement component 190. For instance, block 302 may be initiated once the improvement component 190 receives the optimization problem 110, initial feasible solution 145, and symmetries 165.

The logic flow 300 may initialize a pool of permutations based on the symmetries 165. The symmetries 165 may be expressed in terms of basic generators that encode the simplest form of permutations that may be applied to existing feasible solutions to the constraints 115 to produce additional assignments of values to variables that are guaranteed to also be feasible solutions. However, these generators may be combined together to produce more complex permutations by taking the product of the two generators. Similarly, two permutations may be combined to produce more complex permutations by taking the product of the two permutations. The pool may therefore be initialized with the received generators, this pool composing a pool of known permutations, but not necessarily all of the possible permutations according to the symmetries 165.

The logic flow 300 may select a permutation from the pool at block 306. The permutation may be selected from the pool at random, in a predefined sequence, in the order in which they were added to the pool, or according to any of the known techniques for selecting particular options in a search.

The logic flow 300 may apply the selected permutation to the current solution at block 308. As with the logic flow 200 of FIG. 2, this current solution may have been initialized as the initial feasible solution 145.

The logic flow 300 may use the permuted solution as the current solution if the permuted solution is an improvement to the current solution at block 310. The permuted solution is an improvement on the current solution if it improves the value produced by applying the objective 113 to the solutions.

The logic flow 300 may determine whether untried permutations are present in the pool of known permutations at block 312. A permutation may be untried if it has not been tested against the current solution to see if it improves it. As such, if a new current solution is determined at block 310, every permutation in the pool may be untried. However, if the existing current solution was maintained at block 310, then in some cases the pool may be exhausted. If the pool is not exhausted, the logic flow 300 proceeds back to block 306 to continue searching through the pool of known solutions. If the pool is exhausted, the logic flow 300 proceeds to block 314.

The logic flow 300 may generate additional permutations at block 314. The generators encoding the basic form of the symmetries 165 may be combined with each other, and with the known permutations from the pool, to produce the additional permutations.

The logic flow 300 may branch based on whether additional permutations were found at block 316. If additional permutations were found the logic flow 300 may proceed to block 318. If no additional permutations were found, then the space of permutations has been completely searched and the logic flow 300 may proceed to block 320.

The logic flow 300 may add the additional permutations to the pool at block 318. The logic flow 300 may then proceed back to block 306 so that these additional permutations may be selected and tested with the current solution.

The logic flow 300 may end at block 320. The logic flow 300 may return the current solution as the improved feasible solution 195, thereby completing the work of the improvement component 190.

Figure 4:
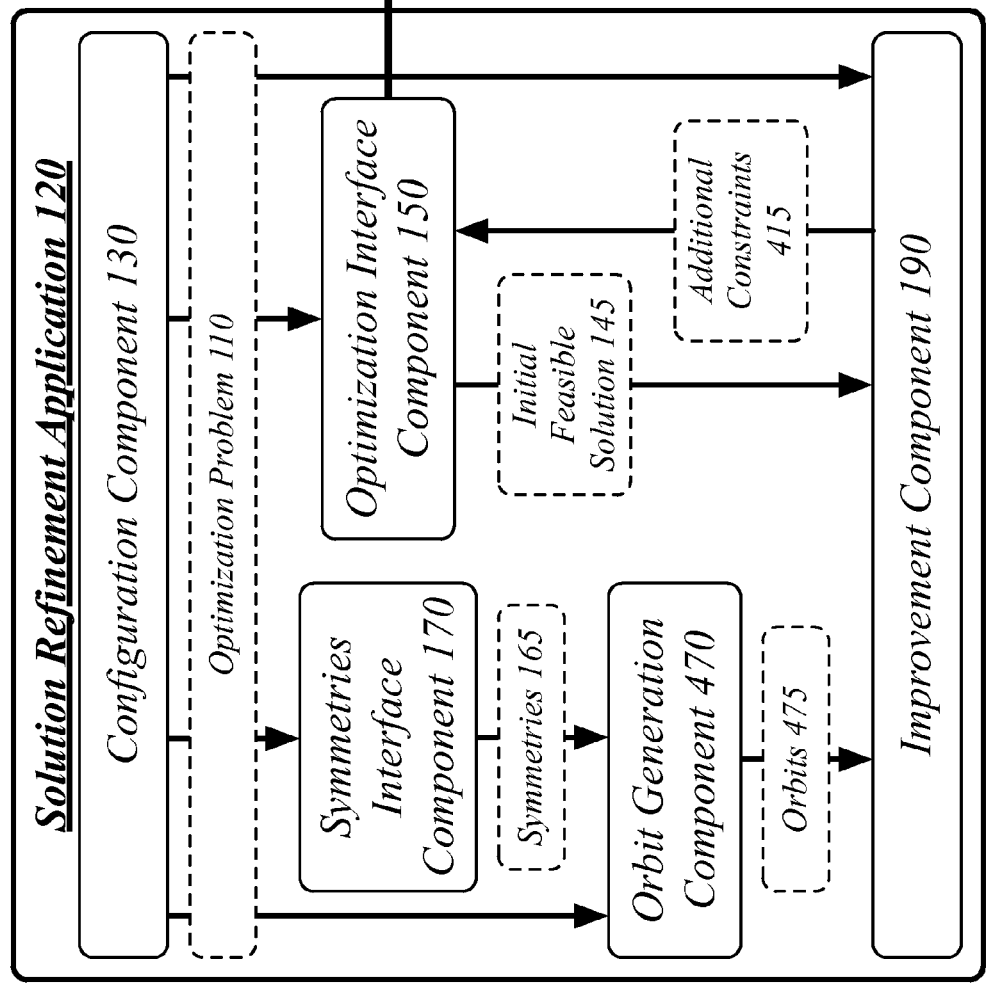
FIG. 4 illustrates an example of the analysis system generating and utilizing orbits.

FIG. 4 illustrates an example of the analysis system 100 generating and utilizing orbits 475. As shown in FIG. 4, the analysis system 100 includes an orbit generation component 470 to generate orbits 475.

In some embodiments, the solution refinement application 120 may include an orbit generation component 470. The orbit generation component 470 may be operative to determine one or more orbits 475 based on the symmetries 165. The improvement component 190 may be operative to use the orbits 475 to determine the improved feasible solution 195 to the optimization problem 110.

An orbit may be defined as the set of variables that are linked either directly through a symmetry or indirectly through one or more relationships defined by one or more symmetries. For example, where a first symmetry is the pair (1,3) and a second the pair (3,6), an orbit (1,3,6) may be formed. In general, the set of orbits 475 may be such that in each orbit, every variable is in a symmetry with every other variable in that orbit. As such, no symmetry will exist that includes variables from two different orbits.

The orbits 475 may be calculated by joining variables into sets according to the symmetries 165. An iterative procedure may be used by the orbit generation component 470 to determine the orbits 475. Each variable of the optimization problem 110 may be initially assigned to its own prospective orbit. The symmetries 165 may then be iteratively examined. For each symmetry, in turn, if the symmetry includes variables from two or more prospective orbits, those prospective orbits are joined together into a new combined prospective orbit. If the symmetry includes variables from only one perspective orbit, no change is made. Once every symmetry is examined, the existing prospective orbits are used as the orbits 475.

Permuting feasible solutions according to the symmetries 165 guarantees that the permutations will also be feasible according to the objective 113. However, a more expansive search space of alternative solution may be created by limiting the values assigned to the variables within each orbit to their summed value across all the variables within that orbit. For example, if an orbit including the first, third, seventh, and twelfth variables have the assigned values (4,0,0,7) for the initial feasible solution 145, the summed value of those variables may be limited to 11, the sum of their values in the initial feasible solution 145.

Unlike permuting strictly according the symmetries 165, not all modifications to the values of the initial feasible solution 145 may result in feasible solutions. However, restricting the sum across the values of the variables within an orbit to be equal to their sum within the initial feasible solution 145 may serve as a guide as to the reasonable assignment of values and may serve to sufficiently constrain the search space as to make the refinement of the initial feasible solution 145 more efficient than devoting additional time to conventional optimization problem solving techniques on the general optimization problem 110. A different solution to this newly constrained problem will always exist, though it may not always be a better solution.

As such, the improvement component 190 may be operative to generate additional constraints 415 constraining the variables within each orbit 475 to a summed total of the values assigned to the variables within each orbit. The optimization interface component 150 may be operative to request a constrained solution to a modified optimization problem 410 defined by the objective 113, constraints 115, and additional constraints 415. The optimization interface component 150 may be operative to transmit the constrained solution to the optimization component 140 and to return the constrained solution to the modified optimization problem as the improved feasible solution 195. While in some cases the same optimization component 140 may be used as for generating the initial feasible solution 145, in other cases a different optimization component or optimization problem solving technique used.

Figure 5:
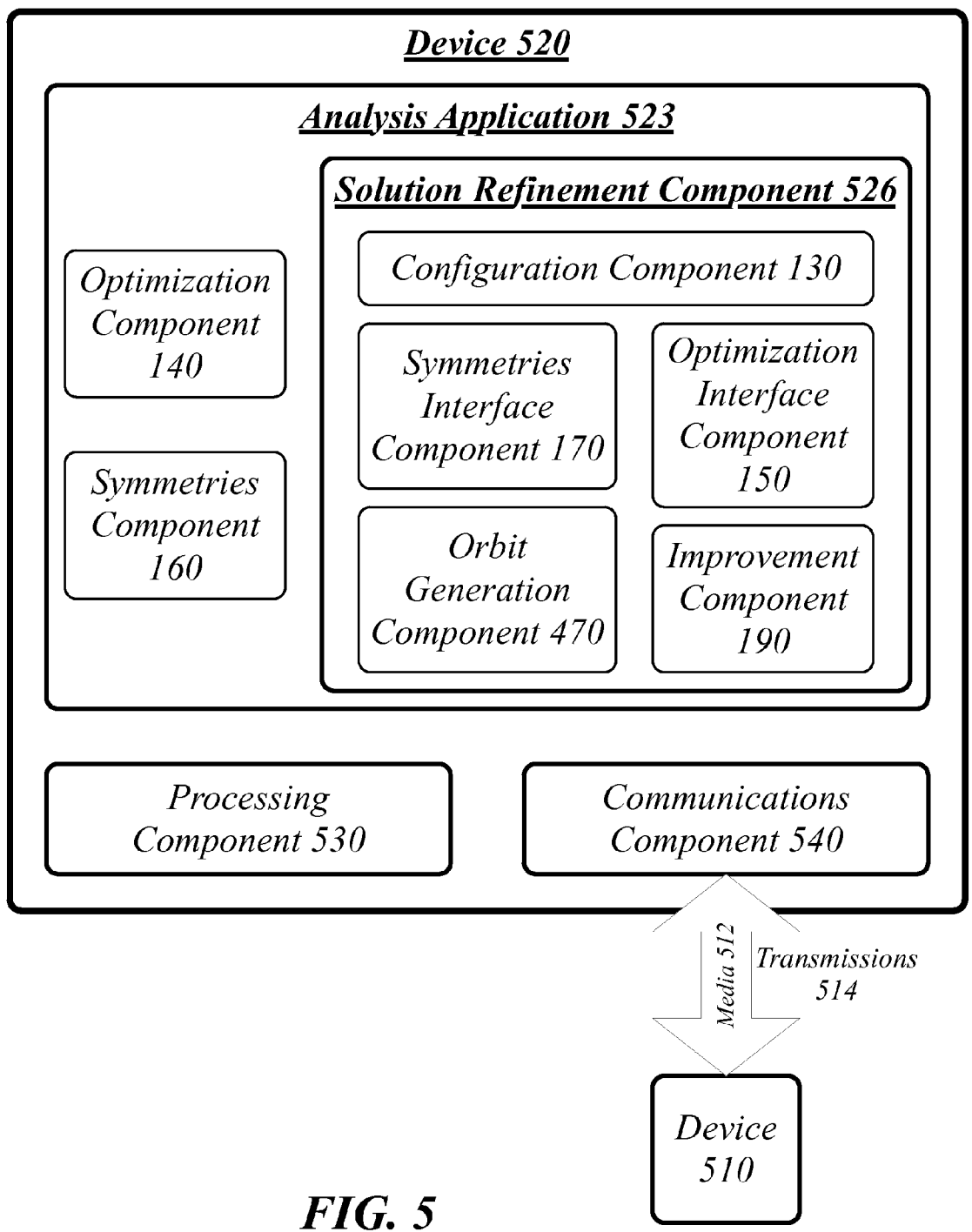
FIG. 5 illustrates an example of a centralized system for the analysis system of FIG. 1.

FIG. 5 illustrates a block diagram of a centralized system 500. The centralized system 500 may implement some or all of the structure and/or operations for the analysis system 100 in a single computing entity, such as entirely within a single device 520.

The device 520 may comprise any electronic device capable of receiving, processing, and sending information for the analysis system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 520 may execute processing operations or logic for the analysis system 100 using a processing component 530. The processing component 530 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 520 may execute communications operations or logic for the analysis system 100 using communications component 540. The communications component 540 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 540 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 512 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated transmission, and so forth. Examples of wireless communications media may include acoustic, radio-frequency (RF) spectrum, infrared and other wireless media.

The device 520 may communicate with other device 510 over a communications media 512 using communications transmissions 514 via the communications component 540. The device 510 may be internal or external to the device 520 as desired for a given implementation.

Device 520 may comprise a workstation, personal computer, or other user device used for the solving of linear optimization problems. The device 520 may execute an analysis application 520 providing linear programming techniques to the user. The analysis application 520 may include the optimization component 140, symmetries component 160, and a solution refinement component 526. The solution refinement component 526 may include the configuration component 130, optimization interface component 150, symmetries interface component 170, improvement component 190, and orbit generation component 470. The analysis application 523 may allow the use of either or both of the refinement techniques based on permuting using symmetries 165 and adding additional constraints based on orbits 475.

The device 520 may communicate with device 510 using transmissions 514 transmitted over media 512. Device 510 may consist of a remote device storing data used in the development of the optimization problem 110, the transmissions 514 comprising the transmission of the stored data. Device 510 may consist of a remote device used to access the device 520 executing the analysis application 523, such as where a remote device is used to command the solving of a linear optimization problem. In general, device 510 may consist of any device used to assist, control, or otherwise participate in the solving of optimization problem 110.

Figure 6:
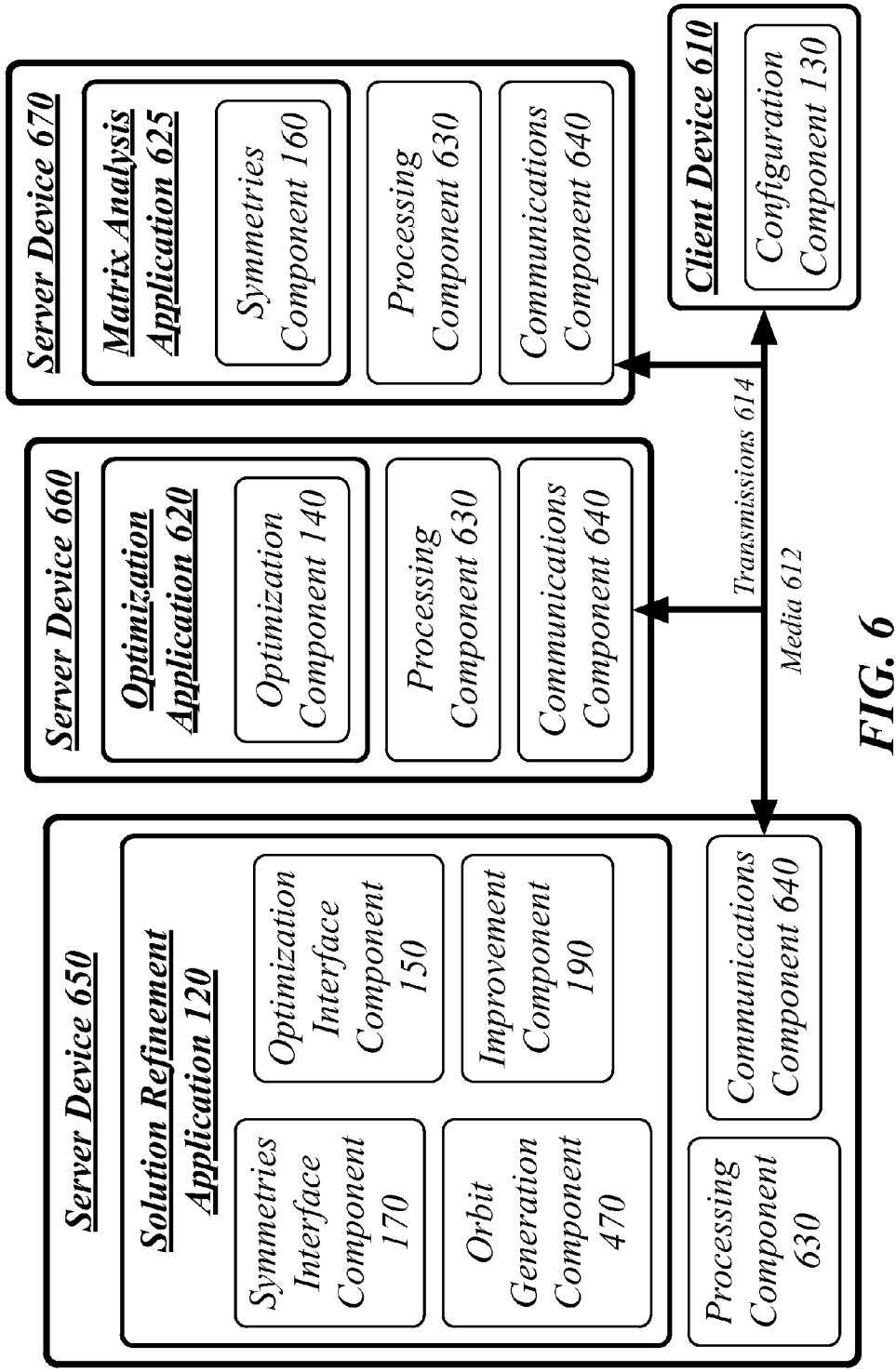
FIG. 6 illustrates an example of a distributed system for the analysis system of FIG. 1.

FIG. 6 illustrates a block diagram of a distributed system 600. The distributed system 600 may distribute portions of the structure and/or operations for the analysis system 100 across multiple computing entities. Examples of distributed system 600 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 600 may comprise a client device 610 and server devices 650, 660, and 670. In general, the client device 610 and the server devices 650, 660, and 670 may be the same or similar to the client device 520 as described with reference to FIG. 5. For instance, the client device 510 and the server devices 650, 660, and 670 may each comprise a processing component 630 and a communications component 640 which are the same or similar to the processing component 530 and the communications component 540, respectively, as described with reference to FIG. 5. In another example, the devices 610, 650, 660, and 670 may communicate over a communications media 612 using communications transmissions 614 via the communications components 640.

The client device 610 may comprise or employ one or more client programs that operate to perform various methodologies in accordance with the described embodiments. In one embodiment, for example, the client device 610 may comprise the configuration component 130. The configuration component 130 may be used by an operator of the analysis system 100 to configure the server devices 650, 660, and 670 for the solving of optimization problem 110.

The server devices 650, 660, and 670 may comprise or employ one or more server programs that operate to perform various methodologies in accordance with the described embodiments. In one embodiment, for example, the server device 650 may implement solution refinement application 120 including the optimization interface component 150, symmetries interface component 170, improvement component 190, and orbit generation component 470. The server device 660 may implement the optimization component 140. The server device 670 may implement the symmetries component 160. The transmissions 614 sent over media 612 may comprise may consist of the transmission of configuration information from the client device 610 to the server devices 650, 660, and 670 and the exchange of information between the server devices 650, 660, and 670 during the solving of optimization problem 110.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 may receive an optimization problem 110 described by an objective 113 and constraints 115 on a plurality of variables at block 702. For example, the optimization problem 110 may be a linear optimization problem or a mixed integer linear optimization problem.

The logic flow 700 may receive an initial feasible solution 145 to the optimization problem 110, the initial feasible solution 145 comprising an assignment of values to the plurality of variables at block 704 satisfying all the constraints 115, the initial feasible solution producing an initial objective value when applied to the objective 113.

The logic flow 700 may receive one or more symmetries 165 for the constraints, the one or more symmetries defining permutations of the plurality of variables guaranteed to produce only additional feasible solutions given the constraints 115 when applied to an existing feasible solution, at block 706.

The logic flow 700 may use the symmetries 165 to produce permutations of the assignment of values to the plurality of variables at block 708. In some cases, the permutations may be produced by using the symmetries 165 individually and in combination as permutations of the assignment of values. In other cases, the permutations may be produced by generating additional constraints 415 and solving a modified optimization problem 410, wherein solving the modified optimization problem 410 implicitly includes considering permutations of the assignment of values in the initial feasible solution 145.

The logic flow 700 may determine which of the permutations results in an improved objective value when applied to the objective 113, the improved objective value improving on the initial objective value produced by the initial feasible solution 145 at block 710. In some cases, this determination may comprise directly determining a permutation resulting from one or more of the symmetries 165 after the iterative consideration of a variety of permutations. In other cases, this determination may comprise determining the permutation as the permutation used to generate the improved feasible solution 195 of a modified optimization problem 410.

The logic flow 700 may select the permutation which results in the improved objective value as the improved feasible solution 195 to the optimization problem 110, the improved feasible solution 195 improving on the initial feasible solution 145 according to the objective 113 at block 712.

The embodiments are not limited to this example.

Figure 8:
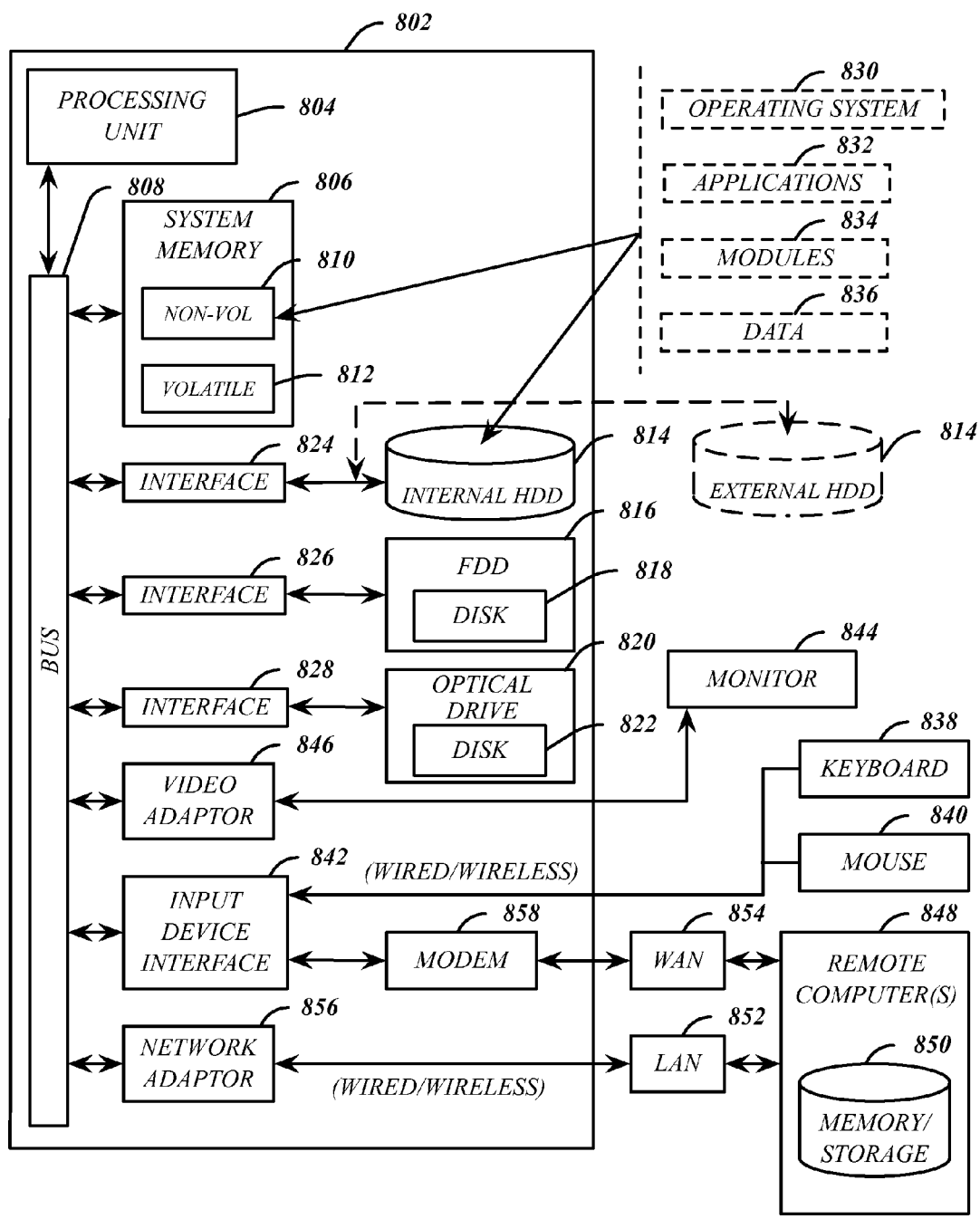
FIG. 8 illustrates an example of an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of transmissions communicated over the communications media. The information can be implemented as transmissions allocated to various transmission lines. In such allocations, each message is a transmission. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the analysis system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.8 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.8x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
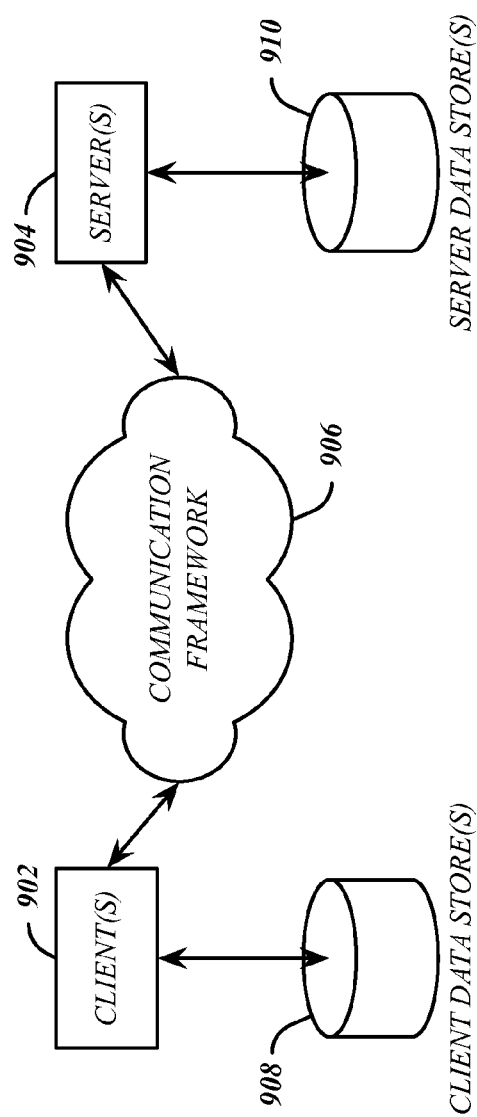
FIG. 9 illustrates an example of an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the client device 910. The servers 904 may implement the server device 950. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The communication framework 906 may be operative to provide communication between members of a distributed computing system, grid computing system, or other multi-computer computing system. For example, the communication framework 906 may connect together geographically co-located computation devices cooperatively processing to solve one or more computational tasks. Alternatively or additionally, the communication framework 906 may connect together geographically-separated computational devices performing mostly-independent processing components of a computational task, such as in grid computing.

One or both of the client data store 908 and server data store 910 may form all or some of a distributed file system, such as may be provided by Apache® Hadoop®.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical transmissions capable of being stored, transferred, combined, compared, and otherwise manipulated. It proves convenient at times, principally for reasons of common usage, to refer to these transmissions as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. At least one non-transitory computer-readable storage medium comprising instructions that, when executed, cause a system to:
   receive an optimization problem described by an objective and constraints on a plurality of variables;
   receive an initial feasible solution to the optimization problem, the initial feasible solution comprising an assignment of values to the plurality of variables satisfying all the constraints, the initial feasible solution producing an initial objective value when applied to the objective;
   receive one or more symmetries of the plurality of variables for the constraints, the one or more symmetries defining permutations of the plurality of variables guaranteed to produce only additional feasible solutions given the constraints when applied to an existing feasible solution;
   use the symmetries to produce permutations of the assignment of values to the plurality of variables;
   determine which of the permutations result in an improved objective value when applied to the objective, the improved objective value improving on the initial objective value produced by the initial feasible solution; and
   select the permutation that results in the improved objective value as an improved feasible solution to the optimization problem, the improved feasible solution improving on the initial feasible solution according to the objective.

2. The at least one non-transitory computer-readable storage medium of claim 1, the optimization problem comprising a linear optimization problem or a mixed integer linear optimization problem.

3. The at least one non-transitory computer-readable storage medium of claim 1, wherein the improved objective value is less than the initial objective value when the optimization problem seeks a minimal feasible solution, wherein the improved objective value is greater than the initial objective value when the optimization problem seeks a maximal feasible solution.

4. The at least one non-transitory computer-readable storage medium of claim 1, wherein using the symmetries to produce permutations comprises further instructions that, when executed, cause a system to:
initialize a pool of known permutations based on the symmetries;
initialize a current solution to be the received initial feasible solution;
search the pool of known permutations for permutations that improve upon the current solution according to the objective; and
add permutations to the pool of known permutations by combining symmetries.

5. The at least one non-transitory computer-readable storage medium of claim 4, comprising further instructions that, when executed, cause a system to:
continue to search the pool of known permutations and continue to add permutations to the pool until additional permutations are not generated by combining the symmetries.

6. The at least one non-transitory computer-readable storage medium of claim 4, comprising further instructions that, when executed, cause a system to:
continue to search the pool of known permutations and continue to add permutations to the pool until a predetermined amount of time has passed or until a predetermined number of cycles have been performed.

7. The at least one non-transitory computer-readable storage medium of claim 4, wherein combining symmetries comprises further instructions that, when executed, cause a system to:
create a new permutation that incorporates each permutation of the assignment of values to the plurality of variables represented by each of the symmetries being combined.

8. The at least one non-transitory computer-readable storage medium of claim 1, comprising further instructions that, when executed, cause a system to:
determine one or more orbits based on the symmetries; and
use the orbits to determine the improved feasible solution to the optimization problem.

9. The at least one non-transitory computer-readable storage medium of claim 8, wherein using the orbits to determine the improved feasible solution to the optimization problem comprises further instructions that, when executed, cause a system to:
generate additional constraints constraining the variables within each orbit to be equal to a summed total of the values assigned to the variables within each orbit; and
solve a modified optimization problem defined by the objective, constraints, and additional constraints.

10. A computer-implemented method, comprising:
receiving, by circuitry, an optimization problem described by an objective and constraints on a plurality of variables;
receiving an initial feasible solution to the optimization problem, the initial feasible solution comprising an assignment of values to the plurality of variables satisfying all the constraints, the initial feasible solution producing an initial objective value when applied to the objective;
receiving one or more symmetries of the plurality of variables for the constraints, the one or more symmetries defining permutations of the plurality of variables guaranteed to produce only additional feasible solutions given the constraints when applied to an existing feasible solution;
using the symmetries to produce permutations of the assignment of values to the plurality of variables;
determining which of the permutations result in an improved objective value when applied to the objective, the improved objective value improving on the initial objective value produced by the initial feasible solution; and
selecting the permutation that results in the improved objective value as an improved feasible solution to the optimization problem, the improved feasible solution improving on the initial feasible solution according to the objective.

11. The method of claim 10, the optimization problem comprising a linear optimization problem or a mixed integer linear optimization problem.

12. The method of claim 10, wherein the improved objective value is less than the initial objective value when the optimization problem seeks a minimal feasible solution, wherein the improved objective value is greater than the initial objective value when the optimization problem seeks a maximal feasible solution.

13. The method of claim 10, wherein using the symmetries to produce permutations comprises:
initializing a pool of known permutations based on the symmetries;
initializing a current solution to be the received initial feasible solution;
searching the pool of known permutations for permutations that improve upon the current solution according to the objective; and
adding permutations to the pool of known permutations by combining symmetries.

14. The method of claim 13, further comprising:
continuing to search the pool of known permutations and continuing to add permutations to the pool until additional permutations are not generated by combining the symmetries.

15. The method of claim 13, further comprising:
continuing to search the pool of known permutations and continuing to add permutations to the pool until a predetermined amount of time has passed or until a predetermined number of cycles have been performed.

16. The method of claim 13, wherein combining symmetries comprises creating a new permutation that incorporates each permutation of the assignment of values to the plurality of variables represented by each of the symmetries being combined.

17. The method of claim 9, further comprising:
determining one or more orbits based on the symmetries; and
using the orbits to determine the improved feasible solution to the optimization problem.

18. The method of claim 17, wherein using the orbits to determine the improved feasible solution to the optimization problem comprises:

generating additional constraints constraining the variables within each orbit to be equal to a summed total of the values assigned to the variables within each orbit; and solving a modified optimization problem defined by the objective, constraints, and additional constraints.

19. An apparatus, comprising:

a processor circuit on a device;

logic, implemented by the processor circuit, the logic to:

receive an optimization problem described by an objective and constraints on a plurality of variables;

receive an initial feasible solution to the optimization problem, the initial feasible solution comprising an assignment of values to the plurality of variables satisfying all the constraints, the initial feasible solution producing an initial objective value when applied to the objective;

receive one or more symmetries of the plurality of variables for the constraints, the one or more symmetries defining permutations of the plurality of variables guaranteed to produce only additional feasible solutions given the constraints when applied to an existing feasible solution; and use the symmetries to produce permutations of the assignment of values to the plurality of variables, determine which of the permutations result in an improved objective value when applied to the objective, the improved objective value improving on the initial objective value produced by the initial feasible solution, and select the permutation that results in the improved objective value as an improved feasible solution to the optimization problem, the improved feasible solution improving on the initial feasible solution according to the objective.

20. The apparatus of claim 19, the optimization problem comprising a linear optimization problem or a mixed integer linear optimization problem.

21. The apparatus of claim 19, wherein the improved objective value is less than the initial objective value when the optimization problem seeks a minimal feasible solution, wherein the improved objective value is greater than the initial objective value when the optimization problem seeks a maximal feasible solution.

22. The apparatus of claim 19, the logic to:

initialize a pool of known permutations based on the symmetries;

initialize a current solution to be the received feasible solution;

search the pool of known permutations for permutations that improve upon the current solution according to the objective; and add permutations to the pool of known permutations by combining symmetries.

23. The apparatus of claim 22, the logic to continue to search the pool of known permutations and continue to add permutations to the pool until additional permutations are not generated by combining the symmetries.

24. The apparatus of claim 22, the logic to continue to search the pool of known permutations and continue to add permutations to the pool until a predetermined amount of time has passed or until a predetermined number of cycles have been performed.

25. The apparatus of claim 22, wherein combining symmetries comprises creating a new permutation that incorporates each permutation of the assignment of values to the plurality of variables represented by each of the symmetries being combined.

26. The apparatus of claim 19, the logic to:

determine one or more orbits based on the symmetries; and use the orbits to determine the improved feasible solution to the optimization problem.

27. The apparatus of claim 26, the logic to:

generate additional constraints constraining the variables within each orbit to be equal to a summed total of the values assigned to the variables within each orbit; and request a constrained solution to a modified optimization problem defined by the objective, constraints, and additional constraints, and return the constrained solution as the improved feasible solution.

* * * * *